US012680687B1

(12) United States Patent
Schubert et al.

(10) Patent No.: US 12,680,687 B1
(45) Date of Patent: Jul. 14, 2026

(54) LIGHTING FIXTURE

(71) Applicant: ABL IP Holding, LLC, Atlanta, GA (US)

(72) Inventors: Matthew Schubert, Roselle, IL (US); Kyle Michael Bradd, Park Ridge, IL (US)

(73) Assignee: ABL IP Holding, LLC, Atlanta, GA (US)

(*) Notice: Subject to any disclaimer, the term of this patent is extended or adjusted under 35 U.S.C. 154(b) by 0 days.

(21) Appl. No.: 19/079,630

(22) Filed: Mar. 14, 2025

(51) Int. Cl.
*F21V 25/12* (2006.01)
*F21S 8/02* (2006.01)
*F21V 15/01* (2006.01)
*F21Y 115/10* (2016.01)

(52) U.S. Cl.
CPC ............ *F21V 25/125* (2013.01); *F21S 8/026* (2013.01); *F21V 15/01* (2013.01); *F21Y 2115/10* (2016.08)

(58) Field of Classification Search
CPC ......... F21V 25/125; F21V 15/01; F21S 8/026
See application file for complete search history.

(56) References Cited

U.S. PATENT DOCUMENTS

| | | | | |
|---|---|---|---|---|
| 11,015,785 | B1 | 5/2021 | Schubert | |
| 11,384,929 | B2 | 7/2022 | Lupien | |
| 11,953,177 | B1 * | 4/2024 | Rashidi Doust | F21V 25/12 |
| 2007/0068099 | A1 * | 3/2007 | Kovacs | F21S 8/026 52/232 |
| 2007/0125018 | A1 * | 6/2007 | Stahl, Sr. | F16L 5/04 52/232 |
| 2017/0138581 | A1 * | 5/2017 | Rashidi Doust | F21V 23/06 |
| 2017/0198870 | A1 * | 7/2017 | Wu | F21V 29/767 |
| 2019/0011096 | A1 * | 1/2019 | Luo | F21V 25/12 |
| 2021/0170209 | A1 * | 6/2021 | Luo | F21V 25/125 |
| 2022/0397248 | A1 * | 12/2022 | Sinphay | F21S 8/026 |
| 2023/0020307 | A1 * | 1/2023 | Smith | F21V 21/045 |

* cited by examiner

*Primary Examiner* — Christopher E Dunay
(74) *Attorney, Agent, or Firm* — Secant IP, PLLC

(57) ABSTRACT

A ceiling fixture may include an enclosure, a light source, at least a portion of the light source is received within the enclosure, and a fire mitigation system coupled to the enclosure. The fire mitigation system may include a plate moveably disposed within the enclosure, a spring arm having an enclosure coupling end and a plate coupling end, the enclosure coupling end coupled to the enclosure and the plate coupling end coupled to the plate, and a fire resistant material.

21 Claims, 11 Drawing Sheets

LIGHTING FIXTURE

TECHNICAL FIELD

The present disclosure is generally directed to lighting fixtures and more specifically to fire resistant lighting fixtures.

BACKGROUND INFORMATION

Building lighting systems may include a variety of lighting fixtures including ceiling fixtures, wall fixtures, free-standing fixtures, and/or any other type of lighting fixture. Ceiling fixtures are configured to be mounted to a ceiling within a room. One example of a ceiling fixture includes a wafer fixture. A wafer fixture is configured to be mounted within an opening formed within the ceiling such that at least a portion the wafer fixture extends through the opening. In the event of a fire, the wafer fixture is exposed to excessive heat resulting in the at least partial destruction of the wafer fixture, exposing the opening within which the wafer fixture is mounted. Exposure of the opening results in the formation of an ingress point for a fire to spread to an above ceiling location. Such an outcome may result in a more rapid destruction of a building. As such, delaying (or preventing) spread of a fire to the above ceiling location may slow the spread of the fire within the remainder of a building, providing additional time to response crews to extinguish or control the fire.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a fire resistant ceiling fixture. The fire resistant ceiling fixture may slow (or prevent) a spread of fire, smoke, and/or heat through the fire resistance ceiling fixture to an above ceiling location.

The fire resistant ceiling fixture may include an enclosure, a lighting assembly at least partially received within the enclosure, and a fire mitigation system coupled to the enclosure. The fire mitigation system may include a plate that is moveable relative to the enclosure between an undeployed and deployed position, a spring arm couples the plate the enclosure, and a fire resistant material.

In some instances, at least a portion of the lighting assembly can be configured to retain the plate in the undeployed position, compressing the spring arm. In the event of a fire, the lighting assembly may be at least partially destroyed, allowing the spring arm to urge the plate to the deployed position. In some instances, the fire resistant material may be an intumescent material that expands when exposed to heat generated by the fire, filling at least a portion of an interior region of the enclosure.

In some instances, the lighting assembly may include a wafer light. When the lighting assembly includes a wafer light, the fire resistant ceiling fixture may be installed before or after installation of the ceiling (e.g., the gypsum board forming the ceiling). Such a configuration may improve installation flexibility.

The fire resistant material may generally be described as a material configured to slow (or prevent) the spread of a fire. For example, the fire resistant material may be configured to slow (or prevent) the spread of a fire through a ceiling fixture and into an above ceiling region. In this example, the spread of the fire through the ceiling fixture may be slowed by at least 5-minutes, at least 10-minutes, at least 15-minutes, or at least 30-minutes relative to a ceiling fixture without the fire resistant material. In some instances, the fire resistant material may comply with one or more fire rated standards (e.g., as determined by the appropriate American Society for Testing and Materials, ASTM, or Underwriters Laboratories, UL, standard).

Figure 1:
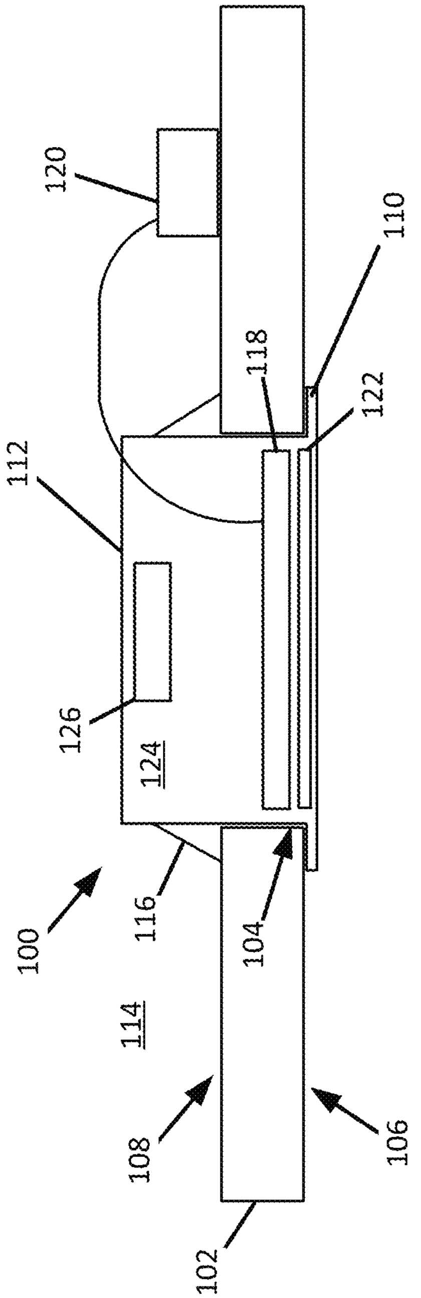
FIG. 1 shows a schematic cross-sectional view of an example of a ceiling fixture mounted within a ceiling, consistent with embodiments of the present disclosure.

FIG. 1 shows a schematic cross-sectional view of an example of a ceiling fixture 100 mounted within a ceiling 102. The ceiling 102 includes a ceiling opening 104 within which the ceiling fixture 100 is mounted. The ceiling opening 104 extends through a room facing surface 106 of the ceiling 102 and through an above ceiling facing surface 108 of the ceiling 102. In other words, the ceiling opening 104 may generally be described as extending completely through the ceiling 102.

The ceiling fixture 100 includes a room portion 110 and a ceiling portion 112. The room portion 110 is configured to engage (e.g., contact) the room facing surface 106 of the ceiling 102. The ceiling portion 112 is configured to extend through the ceiling opening 104. The ceiling portion 112 can extend beyond the above ceiling facing surface 108 and into an above ceiling region 114. The ceiling portion 112 may include ceiling catches 116 configured to engage the above ceiling facing surface 108. The ceiling catches 116 may be configured to exert a force on the above ceiling facing surface 108 that urges the room portion 110 into engagement with the room facing surface 106 of the ceiling 102. As such, the ceiling catches 116 cooperate with the room portion 110 to retain the ceiling fixture 100 within the ceiling opening 104.

The ceiling fixture 100 further includes a light source 118, a driver 120 for powering the light source 118, and a light transparent cover 122. As shown, the driver 120 may be separate from the light source 118 (e.g., coupled to the above ceiling facing surface 108), allowing the driver 120 to be moveable relative to the light source 118 (e.g., during installation). Alternatively, the driver 120 may be coupled to (or integrated with) the light source 118. The light source 118 and the driver 120 may, in some instances, be generally referred to as a lighting assembly. In some instances, the lighting assembly may include the light transparent cover 122. The driver 120 is configured to operate the light source 118 such that the light source 118 emits light through the light transparent cover 122 and into a room below the room facing surface 106 of the ceiling 102. The light source 118 may include one or more light emitting diodes (LEDs) configured to emit light. For example, the light source 118 may be a wafer light having LEDs.

In the event of a fire, at least a portion of the ceiling fixture 100 may be at least partially destroyed. For example, heat generated by a fire may cause one or more of the light transparent cover 122, the light source 118, and/or the driver 120 to melt and/or burn, exposing an interior region 124 of the ceiling fixture 100 to the fire. To impede the progress of the fire into the interior region 124, the ceiling fixture 100 may include a fire mitigation system 126. The fire mitigation system 126 may be a passive system (e.g., heat generated by the fire may cause the fire mitigation system 126 to activate). Absent the fire mitigation system 126, the fire may quickly spread through the interior region 124 of the ceiling fixture 100 and to the above ceiling region 114. Once within the above ceiling region 114, the fire may spread more quickly to other portions of a building.

Figure 2:
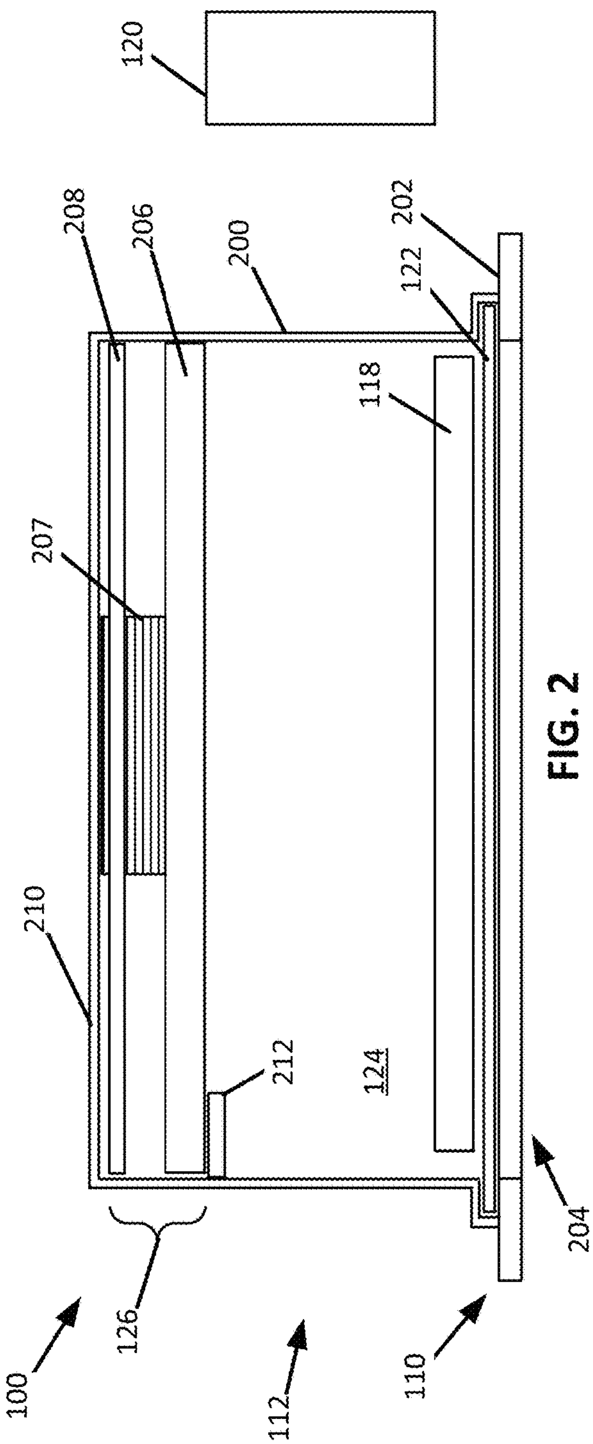
FIG. 2 shows a schematic cross-sectional view of the ceiling fixture of FIG. 1 when not mounted within the ceiling, consistent with embodiments of the present disclosure.

FIG. 2 shows a schematic cross-sectional view of the ceiling fixture 100 removed from the ceiling 102. As shown, the ceiling fixture 100 includes an enclosure 200 and a flange 202 coupled (e.g., removably coupled) to the enclosure 200. The enclosure 200 forms at least a portion of the ceiling portion 112 of the ceiling fixture 100 and the flange 202 forms at least a portion of the room portion 110 of the ceiling fixture 100. The enclosure 200 is configured to receive at least a portion of a lighting assembly. For example, and as shown, at least a portion of the light source 118 is disposed within the enclosure 200 and the driver 120 is disposed outside the enclosure 200.

The flange 202 may be configured to engage the room facing surface 106 (FIG. 1) of the ceiling 102 (FIG. 1). The flange 202 includes a light passthrough 204 through which light generated by the light source 118 passes. The light transparent cover 122 is disposed between the light source 118 and the flange 202. For example, the light transparent cover 122 can extend over (or within) the light passthrough 204. The light source 118 can be disposed between the light transparent cover 122 and the fire mitigation system 126. In other words, the fire mitigation system 126 may be disposed between an enclosure (or above ceiling) end wall 210 of the enclosure 200 and the light source 118.

Figure 3:
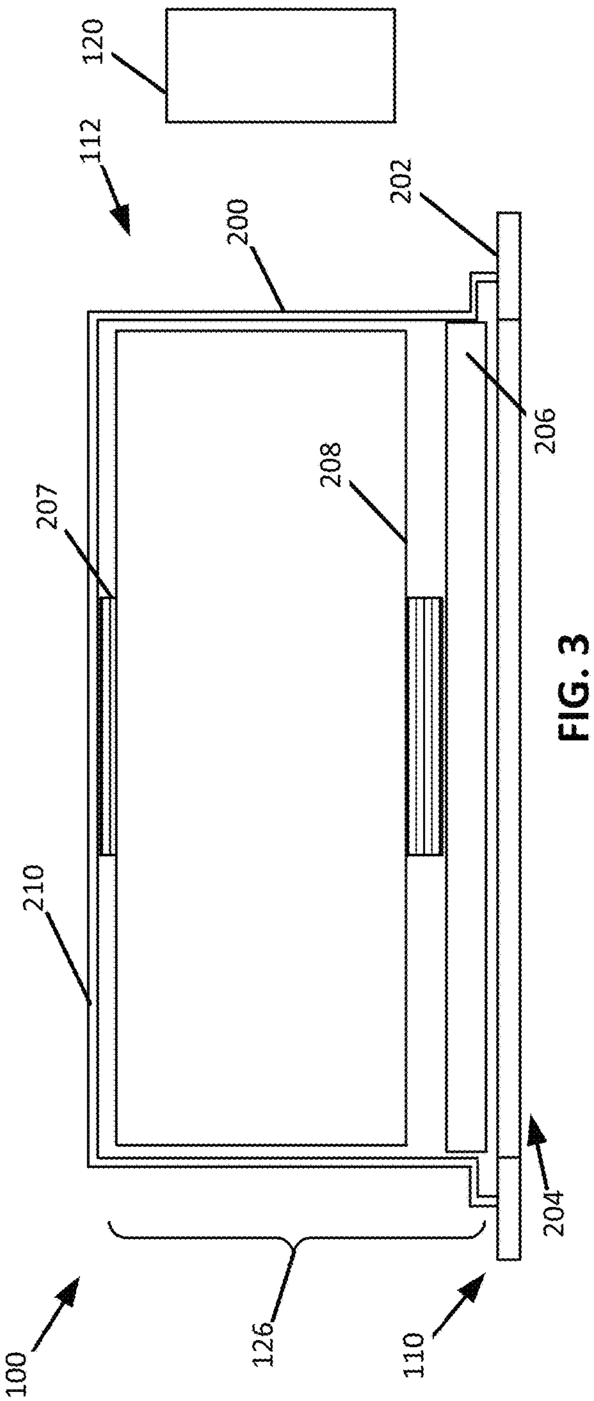
FIG. 3 shows another schematic cross-section view of the ceiling fixture of FIG. 1 when not mounted within the ceiling, consistent with embodiments of the present disclosure.

The fire mitigation system 126 includes a plate 206 moveably coupled to the enclosure 200 and a fire resistant material 208 disposed between the plate 206 and the enclosure 200. The plate 206 is configured to move within the enclosure 200 between an undeployed position (FIG. 2) and a deployed position (FIG. 3). In some instances, the fire mitigation system 126 may further include a plate biasing mechanism 207 (e.g., a spring such as a compression spring or leaf spring) configured to urge the plate 206 towards the deployed position. When in the undeployed position, the plate 206 is supported by a sacrificial support 212. The sacrificial support 212 is configured to be at least partially destroyed in the event of a fire, allowing the plate 206 to transition to the deployed position. For example, the sacrificial support 212 may include a bracket configured to fail in the event of a fire, releasing the plate 206 such that the plate 206 can move towards the deployed position. By way of further example, the sacrificial support 212 may include at least a portion of a lighting assembly. In this example, the plate 206 may be supported by one or more of the light transparent cover 122, the light source 118, and/or the driver 120 such that, as a fire destroys the light transparent cover 122, the light source 118, and/or the driver 120, the plate 206 is released and moves toward the deployed position.

The fire resistant material 208 can be configured to expand when the plate 206 moves to the deployed position. Expansion of the fire resistant material 208 can be configured to at least partially fill the interior region 124 of the ceiling fixture 100, the interior region 124 being at least partially defined by the enclosure 200. Alternatively, the fire resistant material 208 may be a substantially non-expanding fire resistant material. Examples of the fire resistant material 208 may include mineral wool, fiber materials, endothermic materials, refractory materials, an intumescent coating (e.g., an intumescent paint), an intumescent putty, an intumescent fiber, an intumescent rubber, an intumescent plastic, and/or any other fire resistant material. The fire resistant material 208 may comply with one or more fire rated standards (e.g., as determined by the appropriate ASTM or UL standard).

Figure 4:
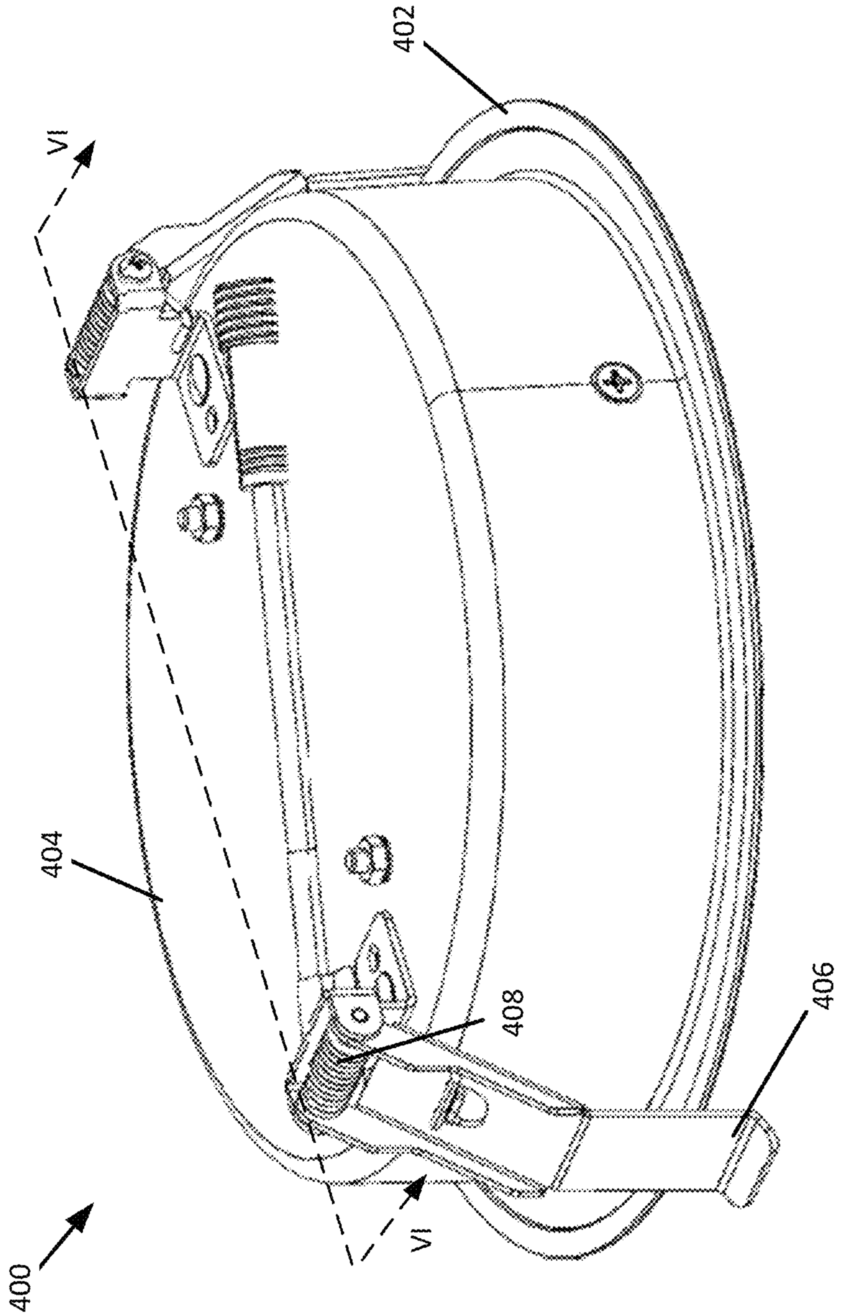
FIG. 4 shows a perspective view of a ceiling fixture, consistent with embodiments of the present disclosure.

FIG. 4 shows a perspective view of a ceiling fixture 400, which is an example of the ceiling fixture 100 of FIG. 1. As shown, the ceiling fixture 400 includes a flange 402 and an enclosure 404 coupled (e.g., removably or fixedly coupled) to the flange 402. A plurality of ceiling catches 406 are coupled to the enclosure 404 and configured to couple the ceiling fixture 400 with a ceiling (e.g., the ceiling 102 of FIG. 1). The ceiling catches 406 are configured to transition between an insertion position and a retention position. The ceiling catches 406 may be biased towards the retention position. For example, a catch biasing mechanism 408 (e.g., a spring, such as a torsion spring) may urge the ceiling catches 406 towards the retention position. When the ceiling fixture 400 is installed within an opening in the ceiling, the ceiling catches 406 and the flange 402 are on opposing sides of ceiling and the ceiling catches 406 urge the flange 402 into engagement with the ceiling, coupling the ceiling fixture 400 with the ceiling. The enclosure 404 may be formed from a steel alloy and/or any other fire resistant material.

Figure 5:
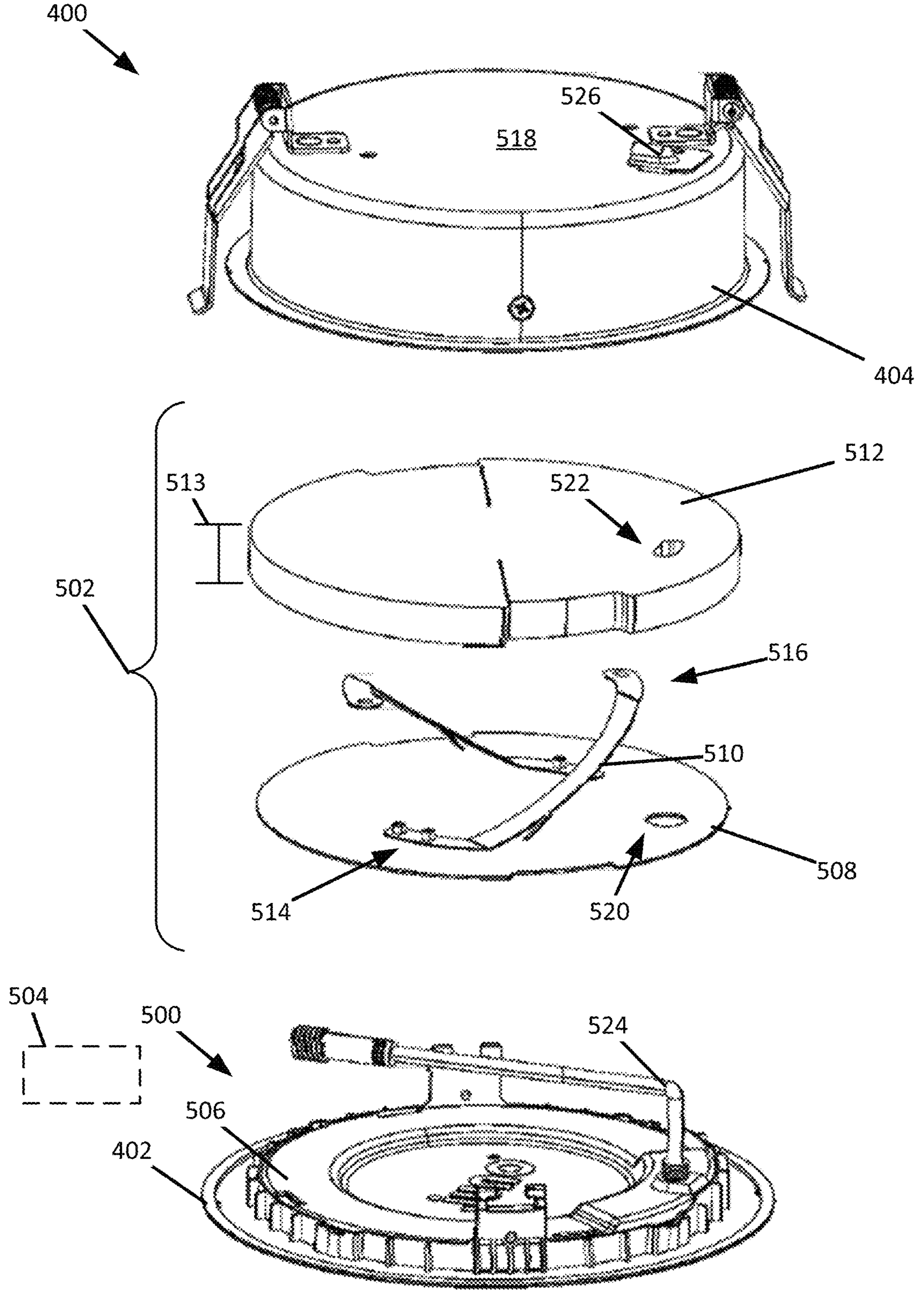
FIG. 5 shows an exploded view of the ceiling fixture of FIG. 4, consistent with embodiments of the present disclosure.

FIG. 5 shows an exploded perspective view of the ceiling fixture 400. As shown, the ceiling fixture 400 includes a wafer light 500 coupled to the flange 402 and a fire mitigation system 502 coupled to the enclosure 404. The fire mitigation system 502 and at least a portion of the wafer light 500 are configured to be received within the enclosure 404. The wafer light 500 includes a light source 506 that is electrically coupled to a driver 504 (shown schematically). As shown, the driver 504 is separate from the light source

506 such that the driver 504 is external to the enclosure 404. For example, a power cable 524 may be configured to extend from the enclosure 404 and electrically couple the driver 504 to the light source 506. The power cable 524 may be configured to removably couple to the driver 504 (e.g., such that the wafer light 500 may be replaced without replacing the driver 504). The wafer light 500 may further include a light transparent cover (not shown) that extends over the light source 506. The wafer light 500 and driver 504 are an example of a lighting assembly.

The fire mitigation system 502 includes a plate 508 (e.g., formed from a steel alloy and/or any other fire resistant material), one or more (e.g., a plurality of) spring arms 510 configured to couple the plate 508 to the enclosure 404 and to urge the plate 508 towards the deployed position, and an intumescent material 512, wherein the intumescent material 512 is a fire resistant material. The plate 508 is movably disposed within the enclosure 404. The one or more spring arms 510 include a plate coupling end 514 and an enclosure coupling end 516. The plate coupling end 514 is configured to couple to the plate 508 and the enclosure coupling end 516 is configured to couple to the enclosure 404 (e.g., an enclosure end wall 518 of the enclosure 404). The intumescent material 512 is disposed between the plate 508 and the enclosure end wall 518. For example, the intumescent material 512 may be coupled to the plate 508 such that the intumescent material 512 extends around the one or more spring arms 510. Additionally, or alternatively, the intumescent material 512 may be coupled to the enclosure 404. In some instances, for example, a plurality of intumescent materials 512 may be provided, wherein a first intumescent material 512 is coupled to the plate 508 and a second intumescent material 512 is coupled to the enclosure end wall 518.

The intumescent material 512 may be a solid material having a shape that generally corresponds to the shape of the plate 508. When the intumescent material 512 is exposed to heat generated by a fire, the intumescent material 512 expands. As such, as the plate 508 moves within the enclosure 404 towards the deployed position, the intumescent material 512 expands, at least partially filling a void between the plate 508 and the enclosure end wall 518. In some instances, the intumescent material 512 may have, for example, a pre-expansion material thickness 513 in a range of about 3 millimeters (mm) to about 17 mm. By way of further example, the intumescent material 512 may have a pre-expansion material thickness 513 of about 12 mm.

The intumescent material 512 is fire resistant and configured to delay a spread of fire through the enclosure 404. For example, the intumescent material 512 may comply with one or more fire rated standards (e.g., as determined by the appropriate ASTM or UL standard). In this example, the intumescent material 512 may be considered a Recognized Component under UL category OEXX2 for Intumescent Materials—Component and may have a flame spread index of zero and a smoke developed value of zero per ASTM E84 (UL 723).

At least a portion of the wafer light 500 is configured to engage (e.g., contact) the plate 508 when the plate 508 is in the undeployed position. As such, when coupling the wafer light 500 with the enclosure 404, the wafer light 500 causes the plate 508 to move from the deployed position towards the undeployed position, compressing the one or more spring arms 510. When the wafer light 500 is coupled to the enclosure 404, the plate 508 is in the undeployed position and the wafer light 500 prevents the one or more spring arms 510 from uncompressing. In other words, the wafer light 500 may generally be described as being configured to compress the one or more spring arms 510 and to retain the plate 508 in the undeployed position. As such, removal of the wafer light 500 (e.g., as a result of being destroyed by a fire) causes the plate 508 to transition to the deployed position. In some instances, such a configuration may allow non-fire resistant lighting fixtures comprising the wafer light 500 to be retrofitted to be fire resistant by mounting the enclosure to the wafer light 500.

As shown, the plate 508 may include a plate passthrough 520 and the intumescent material 512 may include a material passthrough 522. The plate passthrough 520 and the material passthrough 522 may be configured to align with each other such that the power cable 524 may passthrough each of the plate passthrough 520 and the material passthrough 522. The enclosure 404 may include a wire outlet 526 through which the power cable 524 is configured to extend. In the event of a fire, the intumescent material 512 may expand to block the plate passthrough 520.

When the ceiling fixture 400 is exposed to a fire, the wafer light 500 may be at least partially destroyed (e.g., by burning and/or melting). As the wafer light 500 is destroyed, the one or more spring arms 510 cause the plate 508 to move towards the deployed position. In other words, without the wafer light 500 retaining the one or more spring arms 510 in a compressed state, the plate 508 is caused to move by the one or more spring arms 510. As such, the fire mitigation system 502 may generally be described as being a passive system that activates in response to a fire.

Figure 6:
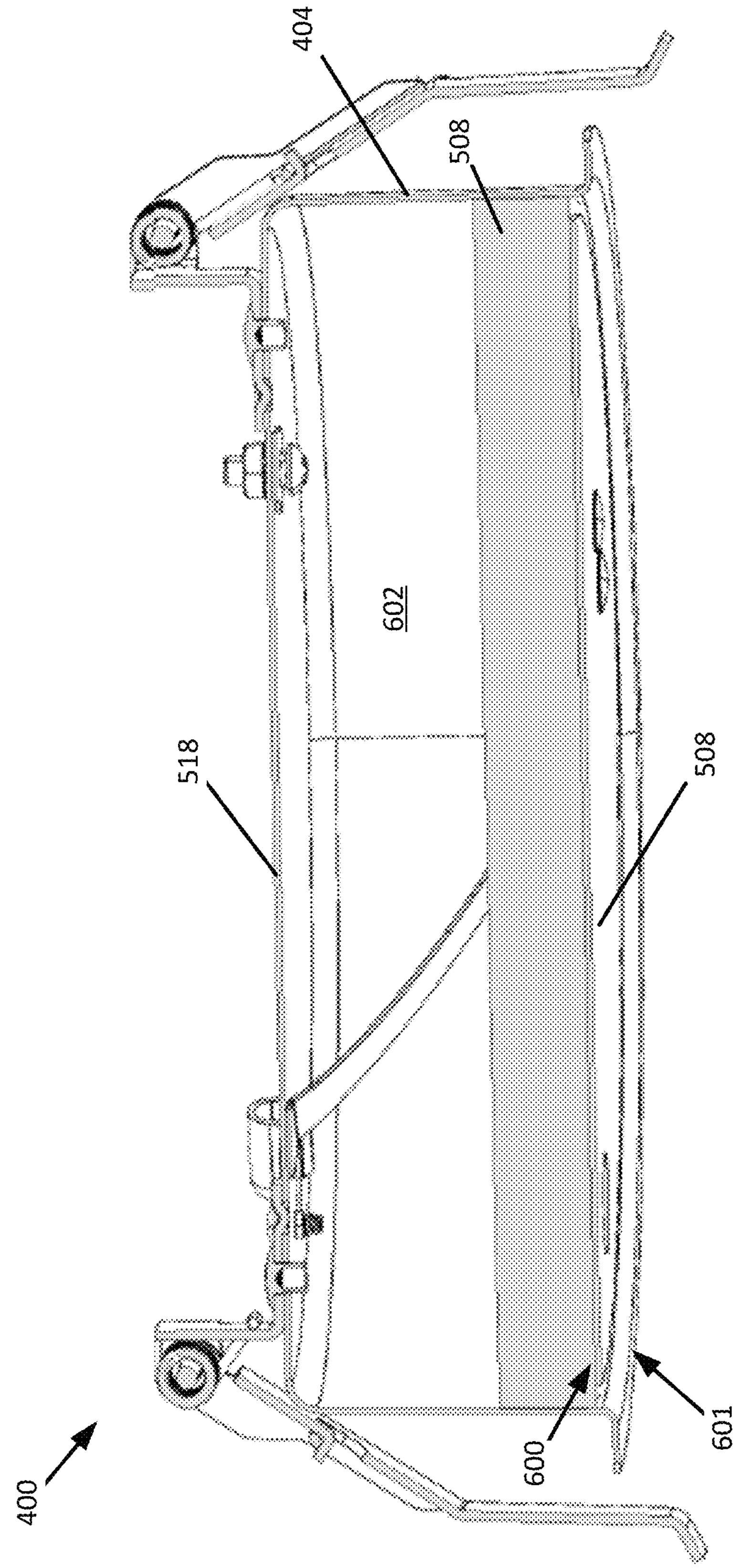
FIG. 6 shows a cross-sectional view of the ceiling fixture of FIG. 4 taken along the VI-VI of FIG. 4, consistent with embodiments of the present disclosure.

FIG. 6 shows a cross-sectional view of the ceiling fixture 400 taken along the line VI-VI of FIG. 4, wherein the wafer light 500 and flange 402 have been decoupled from the enclosure 404. As shown, when the wafer light 500 and flange 402 are removed from the enclosure 404, the plate 508 is able to transition to the deployed position. In the example shown, the intumescent material 512 is coupled to the plate 508 on an enclosure facing side 600 of the plate 508. As such, the intumescent material 512 moves with the plate 508 as the plate transitions to the deployed position. As shown, when in the deployed position, the plate 508 at least partially blocks an open end 601 of the enclosure 404, wherein the wafer light 500 is configured to be at least partially received within the open end 601. As such, when the wafer light 500 no longer occupies the open end 601 during a fire (e.g., as a result of the destruction of the wafer light 500), the plate 508 acts as a fire barrier configured to slow (e.g., prevent) the fire from spreading into the enclosure 404.

When heat is applied to the intumescent material 512 by a fire, the intumescent material 512 begins to expand towards the enclosure end wall 518, creating a char barrier. The plate 508 is configured to discourage (e.g., prevent) the intumescent material 512 from expanding out of the enclosure 404. In other words, the plate 508 is configured to encourage the intumescent material to expand within the enclosure 404, at least partially filling an interior region (or a cavity) 602 of the enclosure 404.

Figure 7:
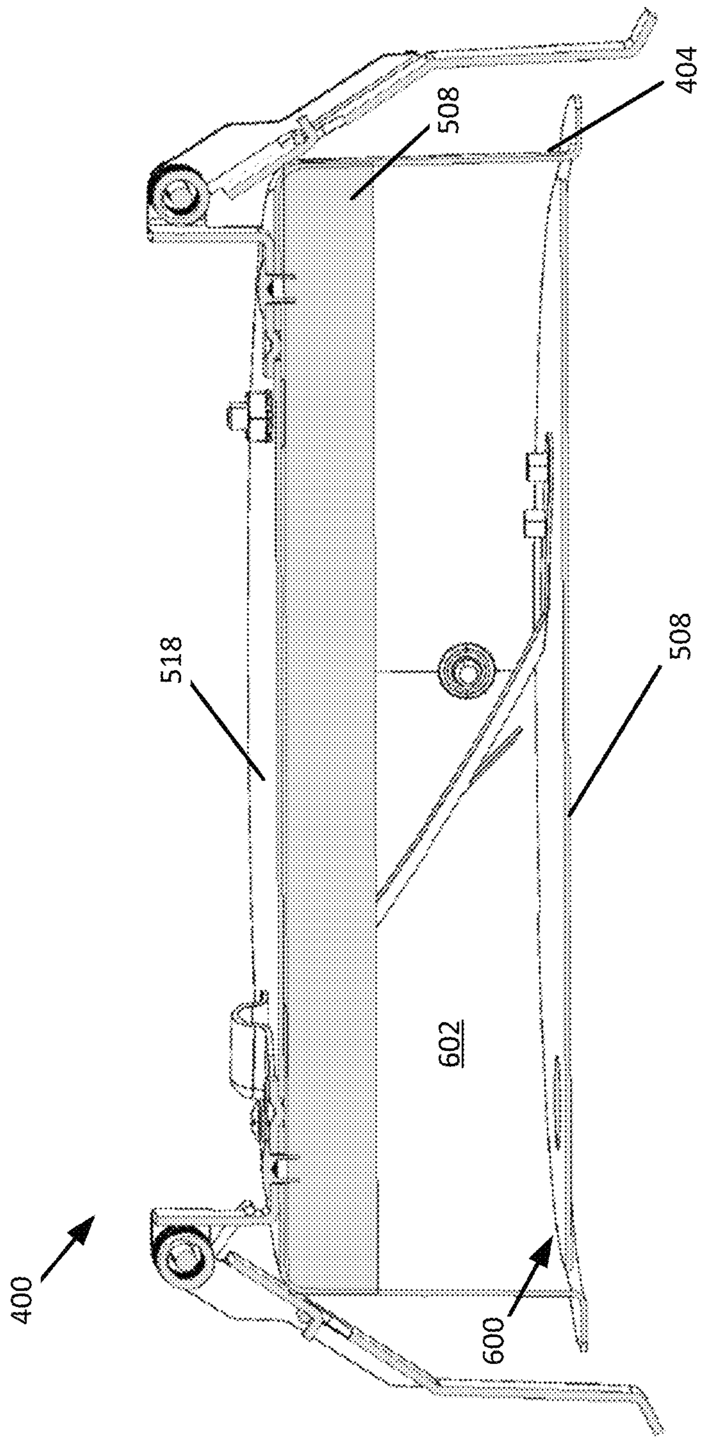
FIG. 7 shows a cross-sectional view of another example of the ceiling fixture of FIG. 4 taken along the line VI-VI of FIG. 4, consistent with embodiments of the present disclosure.

In some instances (e.g., as shown in FIG. 7), the intumescent material 512 may be coupled to the enclosure end wall 518. In these instances, when heat is applied to the intumescent material 512, the intumescent material 512 expands from the enclosure end wall 518 and towards the plate 508. The plate 508 is configured to discourage (e.g., prevent) the intumescent material 512 from expanding out of the enclosure 404. While the plate 508 may be removed in the example of FIG. 7, the expansion of the intumescent material 512 may result in the intumescent material 512 expanding out of the enclosure 404, potentially reducing the fire resistance of the ceiling fixture 400 (e.g., as a result of the intumescent material 512 falling out of the enclosure 404).

Figure 8:
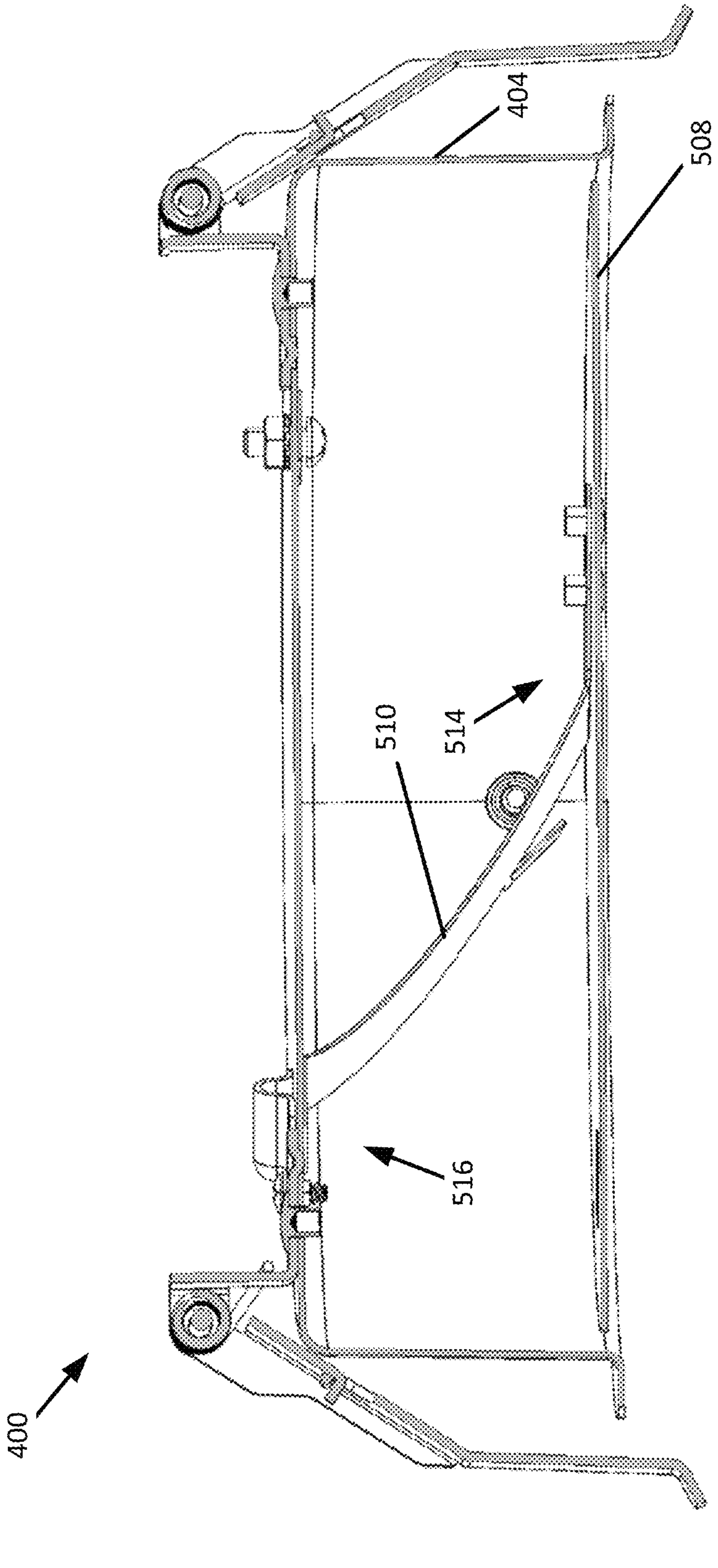
FIG. 8 shows another cross-sectional view of the ceiling fixture of FIG. 4 taken along the line VI-VI of FIG. 4, wherein portions of the ceiling fixture have been removed, consistent with embodiments of the present disclosure.

FIG. 8 shows a cross-sectional view of the ceiling fixture 400 taken along the line VI-VI of FIG. 4, wherein the wafer light 500 and flange 402 have been decoupled from the enclosure 404 and the intumescent material 512 has been removed from the enclosure 404. As shown, the enclosure coupling end 516 of the spring arm 510 is coupled to the enclosure 404 and the plate coupling end 514 is coupled to the plate 508. The plate 508 is shown in the deployed position. When the plate 508 is in the deployed position, the plate 508 may be supported by the spring arm 510.

As further shown, the spring arm 510 may be shaped such that, as the plate 508 transitions to the undeployed position, the spring arm 510 moves towards a flat (e.g., horizontal) position. Such a configuration may allow for a greater travel distance of the plate 508 without increasing a size of the enclosure 404, which may allow for a more compact ceiling fixture 400.

Figure 9:
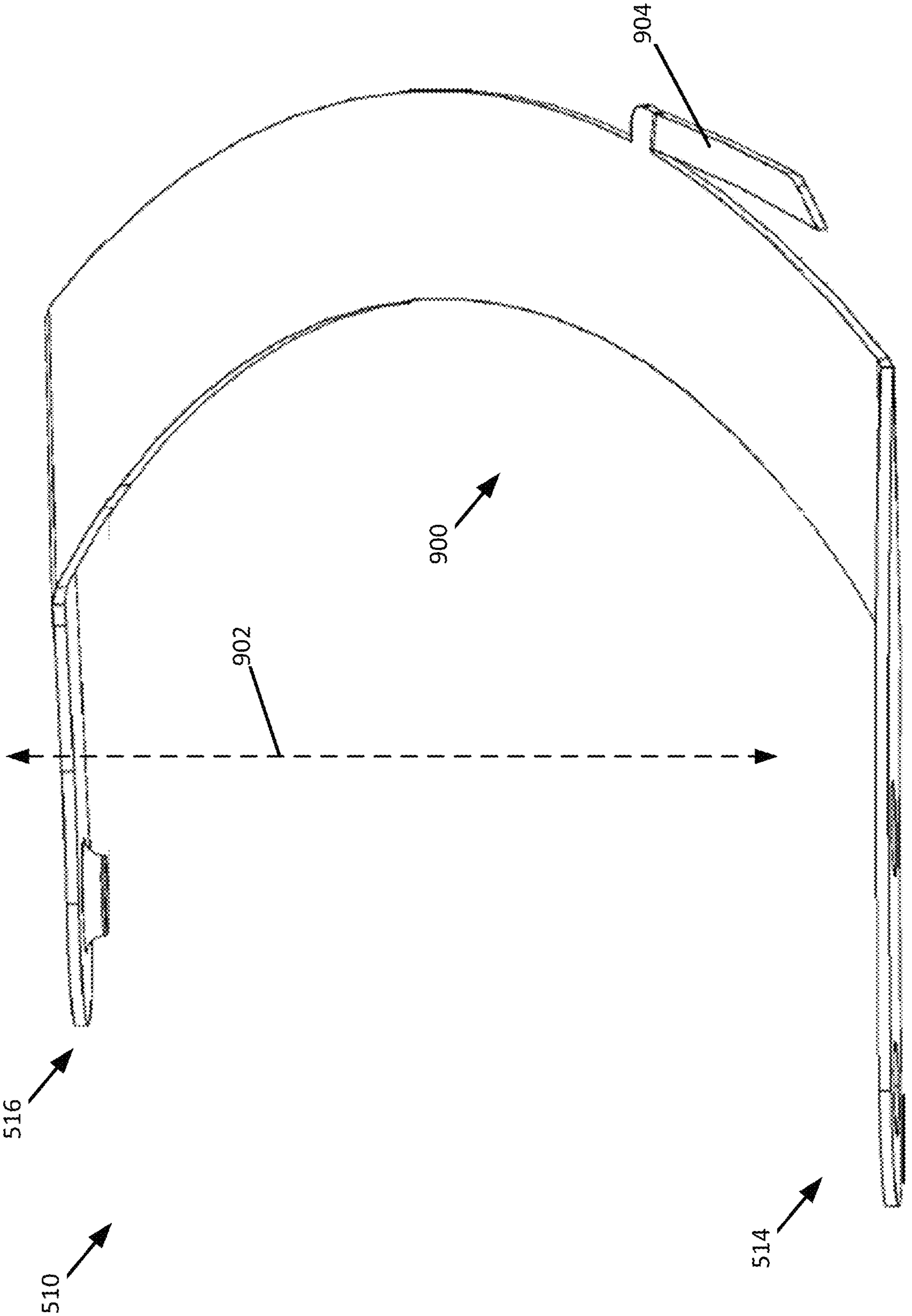
FIG. 9 shows a perspective view of a spring arm of the ceiling fixture of FIG. 4, consistent with embodiments of the present disclosure.

FIG. 9 shows a perspective view of the spring arm 510. As shown, the spring arm 510 includes a sloped region 900 extending between the enclosure coupling end 516 and the plate coupling end 514. The sloped region 900 may curve about an axis of curvature 902 without completely enclosing the axis of curvature 902. For example, the sloped region 900 may extend less than 180° about the axis of curvature 902. The axis of curvature 902 may intersect the plate 508 (FIG. 5) and the enclosure end wall 518 (FIG. 5). In some instances, the sloped region 900 may generally be described as having a helical shape, wherein the helical shape does not complete a full revolution about the axis of curvature 902.

As further shown, the spring arm 510 may include a spring leg 904. The spring leg 904 extends from the sloped region 900 of the spring arm 510 and in a direction of the plate coupling end 514. The spring leg 904 may be configured to engage the intumescent material 512 (FIG. 5) and retain the intumescent material 512 in contact with the plate 508.

Figure 10:
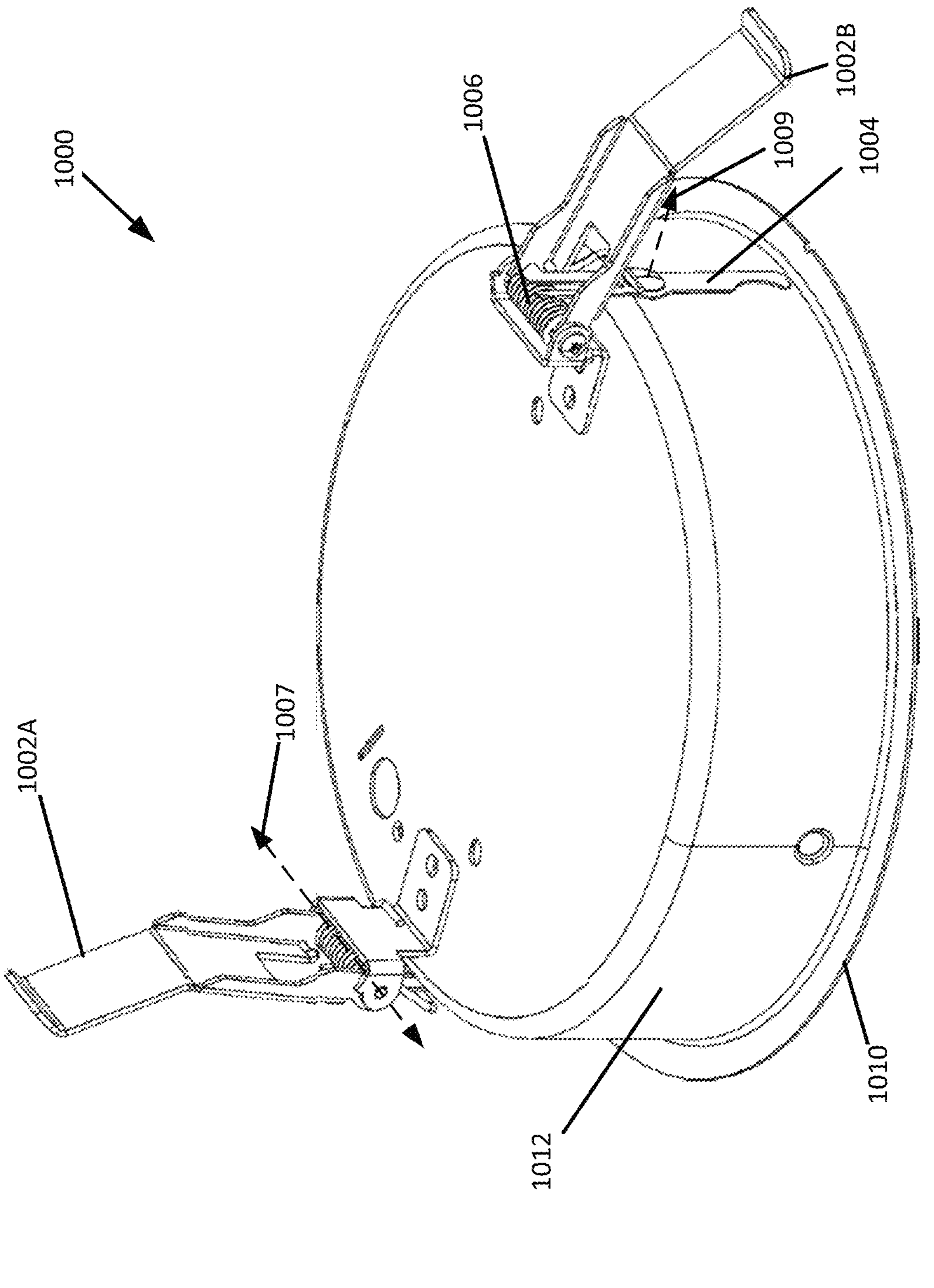
FIG. 10 shows a perspective view of an example of an enclosure configured to be used with the ceiling fixture of FIG. 4, consistent with embodiments of the present disclosure.

FIG. 10 shows a perspective view of an enclosure 1000, which is an example of the enclosure 404 of FIG. 4. As such, the enclosure 1000 may be included in the ceiling fixture 400 of FIG. 4. Inclusion of one of the enclosures 1000 or 404 with the ceiling fixture 400, may cause the ceiling fixture 400 to be fire resistant (e.g., as determined by the appropriate ASTM or UL standard).

As shown, the enclosure 1000 includes a plurality of ceiling catches 1002A and 1002B (referred to collectively as ceiling catches 1002) pivotally coupled to the enclosure 1000 and a plurality of catch locks 1004. The ceiling catches 1002 are configured pivot between an insertion position (as illustrated by ceiling catch 1002A in FIG. 10) and a retention position (as illustrated by ceiling catch 1002B in FIG. 10). When in the insertion position, the ceiling catches 1002 are configured to not substantially interfere with (e.g., prevent) the insertion of the enclosure 1000 through an opening in a ceiling when installing a ceiling fixture (e.g., the ceiling fixture 400). When in the retention position, the ceiling catches 1002 are configured to couple the ceiling fixture to the ceiling. The ceiling catches 1002 may be biased towards the retention position using a catch biasing mechanism 1006 (e.g., a spring, such as a torsion spring). Each of the ceiling catches 1002 are configured to pivot about a corresponding catch axis 1007.

The ceiling catches 1002 are configured to pivot within a range of motion. For example, the range of motion may be about (e.g., within 10% of, 5% of, 4% of, 3% of, 2% of, or 1% of) 180°. By way of further example, the range of motion may be about 200°. By way of still further example, the range of motion may be less than 270°. Within the range of motion, the ceiling catches 1002 may have a coupling range and an insertion range. When the ceiling catches 1002 are in the coupling range, the ceiling catches 1002 are configured to couple the light fixture to the ceiling. When the ceiling catches 1002 are in the insertion range, the light fixture can be installed in (or removed from) the ceiling. The coupling range may be configured to accommodate multiple ceiling thicknesses. For example, the coupling range may be less than or about 90°.

Each catch lock 1004 is configured to cooperate with a corresponding ceiling catch 1002 to selectively restrain a pivotal movement of the corresponding ceiling catch 1002. For example, each catch lock 1004 can be configured to restrain the pivotal movement of a corresponding ceiling catch 1002 to remain within the coupling range. As such, the catch locks 1004 are configured to prevent the ceiling catches 1002 from inadvertently moving within the insertion range (and inadvertently transitioning to the insertion position).

Restraining pivotal movement of the ceiling catch 1002 may prevent the ceiling fixture from inadvertently falling from the ceiling. For example, in the event of a fire, heat from the fire may cause the catch biasing mechanism 1006 to weaken, allowing the weight of the ceiling fixture to cause the ceiling catches 1002 to transition towards the insertion position. When the ceiling catches 1002 reach the insertion position, the ceiling fixture may fall from the ceiling. As such, inclusion of the catch locks 1004 may prevent the ceiling fixture from falling from the ceiling as a result of the catch biasing mechanism 1006 weakening from heat generated by a fire. Such a configuration may improve the fire rating of the ceiling fixture.

Each catch lock 1004 may be configured to selectively transition between a locked position in which pivotal movement of each ceiling catch 1002 is restrained and an unlocked position in which pivotal movement of the ceiling catch 1002 is not restrained by the catch lock 1004. Each catch lock 1004 may be transitioned between the locked and unlocked position in response to a force applied to the catch locks 1004 by an individual installing the ceiling fixture. In some instances, the catch locks 1004 may be biased towards the locked position. In the example shown in FIG. 10, each catch lock 1004 is pivotally coupled to the enclosure 1000 such that pivotal movement transitions each catch lock 1004 between the locked and unlocked positions. Each catch lock 1004 may be configured to pivot about a corresponding lock axis 1009, wherein each lock axis 1009 extends transverse to (e.g., perpendicular or non-perpendicular to) a respective catch axis 1007.

As further shown, each catch lock 1004 may be sized to not interfere with the installation of the ceiling fixture. For example, and as shown, the enclosure 1000 may include an enclosure mount 1010 for coupling the enclosure 1000 to a wafer light (e.g., the wafer light 500 of FIG. 5) and one or more enclosure sidewalls 1012 extending from the enclosure mount 1010. In this example, each catch lock 1004 may be coupled to the one or more enclosure sidewalls 1012 such that each catch lock 1004 does not extend beyond the enclosure mount 1010. The enclosure mount 1010 may be disposed on a room facing surface of a ceiling when installed.

Figure 11:
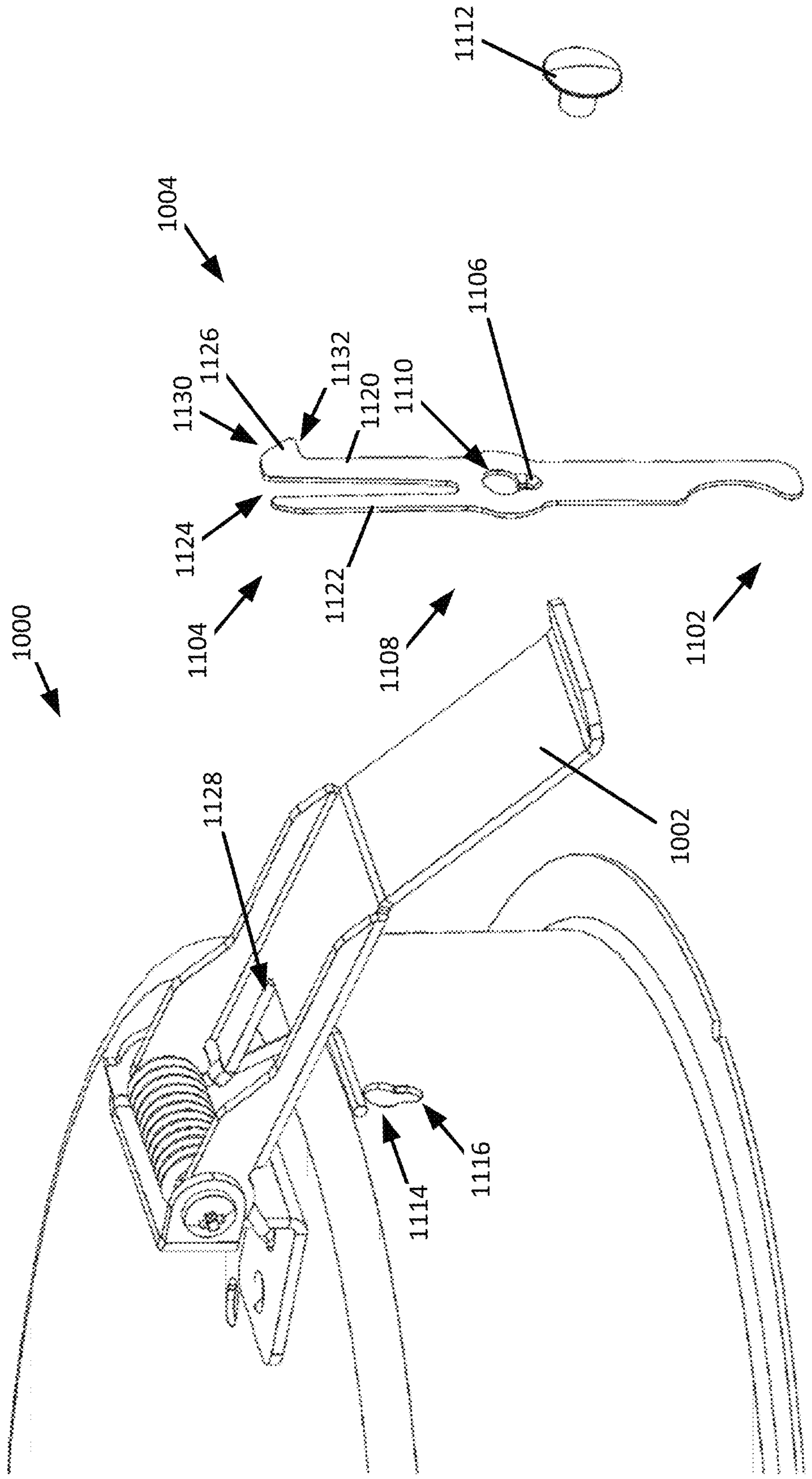
FIG. 11 shows a partial exploded view of a portion of the enclosure of FIG. 10, consistent with embodiments of the present disclosure.

FIG. 11 shows a partial exploded view of a portion of the enclosure 1000. As shown, the catch locks 1004 include an actuation end 1102, a catch end 1104, and an index protrusion 1106 disposed between the actuation end 1102 and the catch end 1104. The catch lock 1004 is pivotally coupled to the enclosure 1000 at a lock pivot point 1108, the lock pivot point 1108 being disposed between the actuation end 1102 and the catch end 1104. As shown, a lock opening 1110 extends through the catch lock 1004 at the lock pivot point 1108 such that a lock axle 1112 extends through the lock opening 1110 to pivotally couple the catch lock 1004 to the enclosure 1000.

The enclosure 1000 includes an axle passthrough 1114. The axle passthrough 1114 is configured to receive the lock axle 1112 to pivotally couple the catch lock 1004 to the enclosure 1000. The enclosure 1000 may further include an index cutout 1116. The index cutout 1116 may be included with the axle passthrough 1114. The index protrusion 1106 is configured to be selectively received in the index cutout 1116. The index protrusion 1106 is configured to move out of the index cutout 1116 in response to a force being applied on the catch lock 1004 that causes the catch lock 1004 to rotate. When the index protrusion 1106 is received within the index cutout 1116, the catch lock 1004 may be in the locked position. In other words, the index cutout 1116 and the index protrusion 1106 are configured to cooperate to form a detent mechanism, wherein the detent mechanism is configured to selectively retain the catch lock 1004 in the locked position. As such, in some instances, the catch lock 1004 may generally be described as being configured to be selectively retained in the locked position.

As further shown, the catch lock 1004 includes a latching arm 1120, a deformable arm 1122, and a deformation channel 1124 extending between the deformable arm 1122 and the latching arm 1120. The latching arm 1120 includes a latching protrusion 1126 configured to engage with a portion of a corresponding ceiling catch 1002 to restrain pivotal movement of the ceiling catch 1002. For example, and as shown, the ceiling catch 1002 may include an arm passthrough 1128 through which at least a portion of the catch lock 1004 (e.g., the latching arm 1120, the deformable arm 1122, and the deformation channel 1124) can extend. When the catch lock 1004 extends through the arm passthrough 1128 and the catch lock 1004 is in the locked position, the latching protrusion 1126 is configured extend over a portion of the ceiling catch 1002 such that pivotal movement of the ceiling catch 1002 is restrained. When the catch lock 1004 extends through the arm passthrough 1128 and is pivoted to the unlocked position, the deformable arm 1122 deforms as a result of contacting the ceiling catch 1002, allowing the latching protrusion 1126 to move such that the latching protrusion 1126 no longer extends over a portion of the ceiling catch 1002 and pivotal movement of the ceiling catch 1002 is no longer restrained by the latching protrusion 1126. In some instances, the latching protrusion 1126 may include an insertion surface 1130 and a retention surface 1132. The retention surface 1132 is configured to engage the ceiling catch 1002 to restrain pivotal movement of the ceiling catch 1002. The insertion surface 1130 extends transverse (e.g., at a non-perpendicular angle) to the retention surface 1132 to encourage insertion of the catch lock 1004 into the arm passthrough 1128. For example, the insertion surface 1130 may be configured to urge the catch lock 1004 towards the unlocked position when the catch lock 1004 is being inserted into the arm passthrough 1128 (e.g., as a result of engagement with the ceiling catch 1002).

Figure 12:
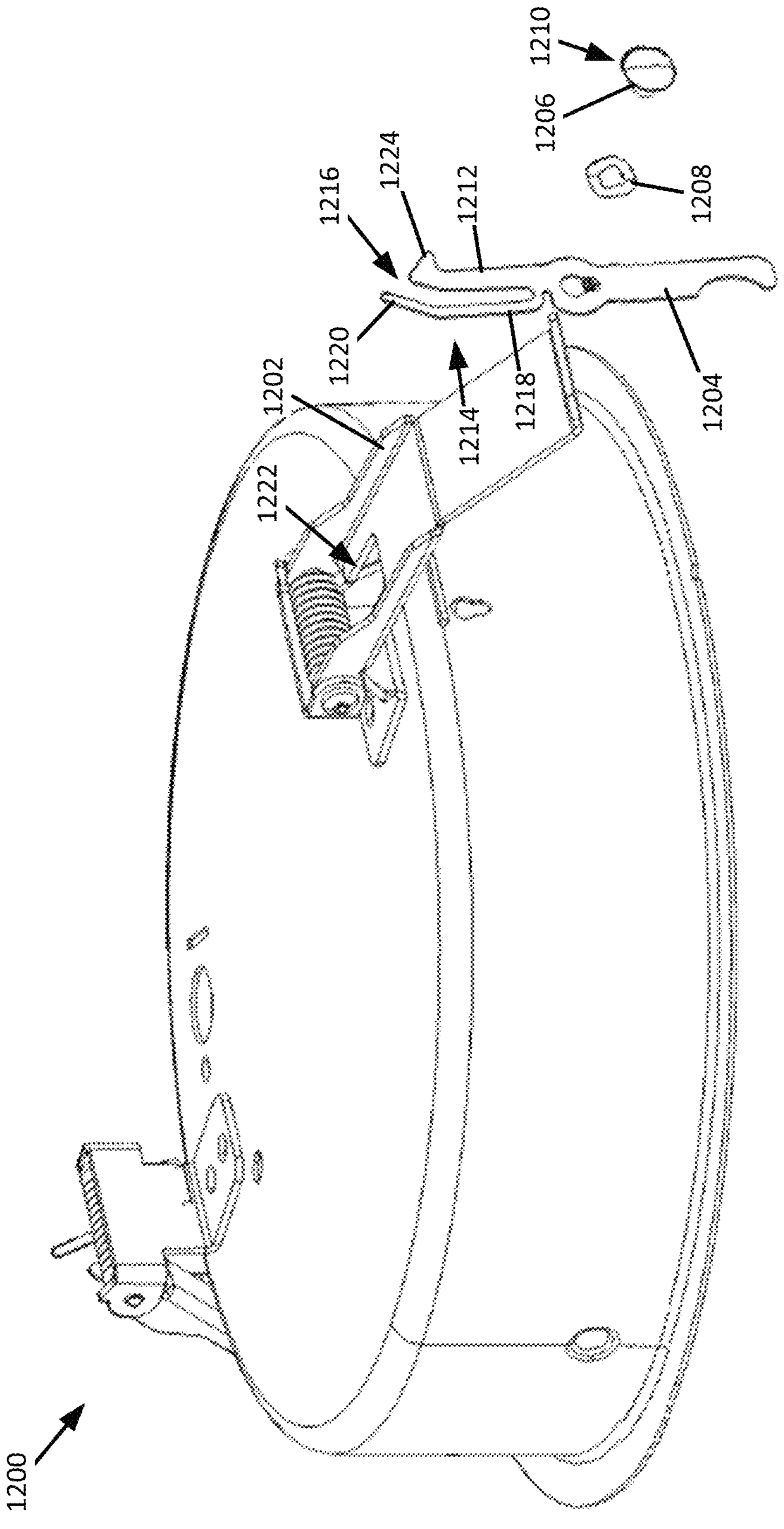
FIG. 12 shows an exploded view of an enclosure, consistent with embodiments of the present disclosure.

FIG. 12 shows a partial exploded view of an enclosure 1200, which is an example of the enclosure 1000 of FIG. 10. As shown, the enclosure 1200 includes a plurality of ceiling catches 1202 and a plurality of catch locks 1204, each catch lock 1204 configured to cooperate with a respective ceiling catch 1202 to selectively restrain pivotal movement of a respective ceiling catch 1202. A lock axle 1206 may pivotally couple each catch lock 1204 to the enclosure 1200, wherein a wave washer 1208 is disposed between the catch lock 1204 and an axle distal end 1210 of the lock axle 1206. The wave washer 1208 may be configured to generate a biasing force that regulates an amount of force required to rotate the catch locks 1204 from a locked position to an unlocked position. As such, the wave washer 1208 may generally be described as generating a biasing force that adjusts the actuation force of the catch lock 1204. In some instances, a detent mechanism (e.g., similar to that of FIG. 11) may selectively retain the catch locks 1204 in the locked position.

As also shown, the catch locks 1204 may each include a latching arm 1212, a deformable arm 1214, and a deformation channel 1216 that extends between the latching arm 1212 and the deformable arm 1214. The deformable arm 1214 may include a first arm segment 1218 and a second arm segment 1220, the first arm segment 1218 extending transverse (e.g., perpendicular or non-perpendicular to) the second arm segment 1220. For example, the first arm segment 1218 may extend from the second arm segment 1220 such that the second arm segment 1220 extends in a direction towards the latching arm 1212. In this example, an obtuse angle can be formed between the first and second arm segments 1218 and 1220, wherein the obtuse angle opens in a direction of the latching arm 1212. Such a configuration may encourage easier insertion into an arm passthrough 1222 of a respective ceiling catch 1202. As further shown, the latching arm 1212 includes a latching protrusion 1224 having a similar configuration as the latching protrusion 1126 of FIG. 11.

While the plates 206 and 508 are described herein as being configured move within a respective enclosure 200, 404, or 1000, other configurations are possible. For example, the plates 206 or 508 may be fixed relative to the respective enclosure 200, 404, or 1000. In this example, a fire resistant material may be disposed between the plate 206 or 508 and the enclosure 200, 404, or 1000. Additionally, or alternatively, a fire resistant material may extend along each of the sidewalls of the enclosure 200, 404, or 1000. In these instances, the enclosures 200, 404, or 1000 may be double walled and the fire resistant material may be disposed between the double walls.

An example of a ceiling fixture, consistent with the present disclosure, may include an enclosure, a light source, at least a portion of the light source is received within the enclosure, and a fire mitigation system coupled to the enclosure. The fire mitigation system may include a plate moveably disposed within the enclosure, a spring arm having an enclosure coupling end and a plate coupling end, the enclosure coupling end coupled to the enclosure and the plate coupling end coupled to the plate, and a fire resistant material.

In some instances, the fire resistant material may be coupled to the plate. In some instances, the fire resistant material may be an intumescent material. In some instances, at least a portion of the light source may be configured to compress the spring arm. In some instances, the ceiling fixture may further include a ceiling catch pivotally coupled to the enclosure. In some instances, the ceiling fixture may further include a catch lock configured to selectively restrain pivotal movement of the ceiling catch. In some instances, the catch lock may be pivotally coupled to the enclosure and configured to pivot between a locked position and an unlocked position. In some instances, a detent mechanism may be formed between the enclosure and the catch lock, the detent mechanism configured to selectively retain the catch lock in the locked position. In some instances, the catch lock may include a latching arm, a deformable arm, and a deformation channel extending between the latching arm and the deformable arm and the ceiling catch may include an arm passthrough through which at least a portion of the catch lock extends. In some instances, the spring arm may include a spring leg configured to engage the fire resistant material.

An example of an enclosure for coupling to a ceiling fixture, consistent with the present disclosure, may include a plate moveable between a deployed position and an undeployed position, a spring arm coupled to the plate and configured to urge the plate toward the deployed position, and a fire resistant material coupled to the plate.

In some instances, the fire resistant material may be an intumescent material. In some instances, the plate may be configured to move from the deployed position to the undeployed position in response to the enclosure being coupled to at least a portion of a lighting assembly. In some instances, when the plate is in the undeployed position, the spring arm may be compressed. In some instances, the enclosure may further include a pivoting ceiling catch. In some instances, the enclosure may further include a catch lock configured to selectively restrain pivotal movement of the ceiling catch. In some instances, the catch lock may be configured to pivot between a locked position and an unlocked position. In some instances, the catch lock may be configured to be selectively retained in the locked position. In some instances, the catch lock may include a latching arm, a deformable arm, and a deformation channel extending between the latching arm and the deformable arm. In some instances, the ceiling catch may include an arm passthrough through which at least a portion of the catch lock extends.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A ceiling fixture comprising:

an enclosure;

a light source, at least a portion of the light source is received within the enclosure; and a fire mitigation system coupled to the enclosure, the fire mitigation system comprising:

a plate moveably disposed within the enclosure;

a spring arm having an enclosure coupling end and a plate coupling end, the enclosure coupling end coupled to the enclosure and the plate coupling end coupled to the plate; and a fire resistant material, wherein the spring arm includes a sloped region extending between the plate coupling end and the enclosure coupling end such that compression of the spring arm causes the spring arm to move towards a horizontal position.

2. The ceiling fixture of claim 1, wherein the fire resistant material is coupled to the plate.

3. The ceiling fixture of claim 1, wherein the fire resistant material is an intumescent material disposed between an end wall of the enclosure and the plate.

4. The ceiling fixture of claim 1, wherein at least a portion of the light source is configured to compress the spring arm.

5. The ceiling fixture of claim 1 further comprising a ceiling catch pivotally coupled to the enclosure.

6. The ceiling fixture of claim 5 further comprising a catch lock configured to selectively restrain pivotal movement of the ceiling catch.

7. The ceiling fixture of claim 6, wherein the catch lock is pivotally coupled to the enclosure and configured to pivot between a locked position and an unlocked position.

8. The ceiling fixture of claim 7, wherein a detent mechanism is formed between the enclosure and the catch lock, the detent mechanism configured to selectively retain the catch lock in the locked position.

9. The ceiling fixture of claim 1, wherein the spring arm includes a spring leg configured to engage the fire resistant material.

10. The ceiling fixture of claim 1, wherein the spring arm includes a sloped region extending between the plate coupling end and the enclosure coupling end such that compression of the spring arm causes the spring arm to move towards a horizontal position.

11. The ceiling fixture of claim 1, wherein the sloped region curves about an axis of curvature without completely enclosing the axis of curvature and, wherein, the axis of curvature intersects the plate and an end wall of the enclosure.

12. An enclosure for coupling to a ceiling fixture for a light source comprising:

a plate moveable between a deployed position and an undeployed position;

a spring arm coupled to the plate and configured to urge the plate toward the deployed position; and a fire resistant material coupled to the plate, wherein the spring arm includes a sloped region extending between the plate coupling end and the enclosure coupling end such that compression of the spring arm causes the spring arm to move towards a horizontal position.

13. The enclosure of claim 12, wherein the plate is configured to move from the deployed position to the undeployed position in response to the enclosure being coupled to at least a portion of a lighting assembly.

14. The enclosure of claim 12, further comprising a pivoting ceiling catch.

15. The enclosure of claim 14, further comprising a catch lock configured to selectively restrain pivotal movement of the ceiling catch.

16. The enclosure of claim 15, wherein the catch lock is configured to pivot between a locked position and an unlocked position.

17. The enclosure of claim 16, wherein the catch lock is configured to be selectively retained in the locked position.

18. The enclosure of claim 16, wherein the catch lock includes a latching arm, a deformable arm, and a deformation channel extending between the latching arm and the deformable arm.

19. The enclosure of claim 18, wherein the ceiling catch includes an arm passthrough through which at least a portion of the catch lock extends.

20. The ceiling fixture of claim 12, wherein the sloped region curves about an axis of curvature without completely enclosing the axis of curvature and, wherein, the axis of curvature intersects the plate and an end wall of the enclosure.

21. A ceiling fixture comprising:

an enclosure;

a light source, at least a portion of the light source is received within the enclosure;

a fire mitigation system coupled to the enclosure, the fire mitigation system comprising:

a plate moveably disposed within the enclosure;

a spring arm having an enclosure coupling end and a plate coupling end, the enclosure coupling end coupled to the enclosure and the plate coupling end coupled to the plate; and a fire resistant material;

a ceiling catch pivotally coupled to the enclosure; and a catch lock configured to selectively restrain pivotal movement of the ceiling catch, wherein the catch lock includes a latching arm, a deformable arm, and a deformation channel extending between the latching arm and the deformable arm and the ceiling catch includes an arm passthrough through which at least a portion of the catch lock extends.

* * * * *